UNITED STATES PATENT OFFICE.

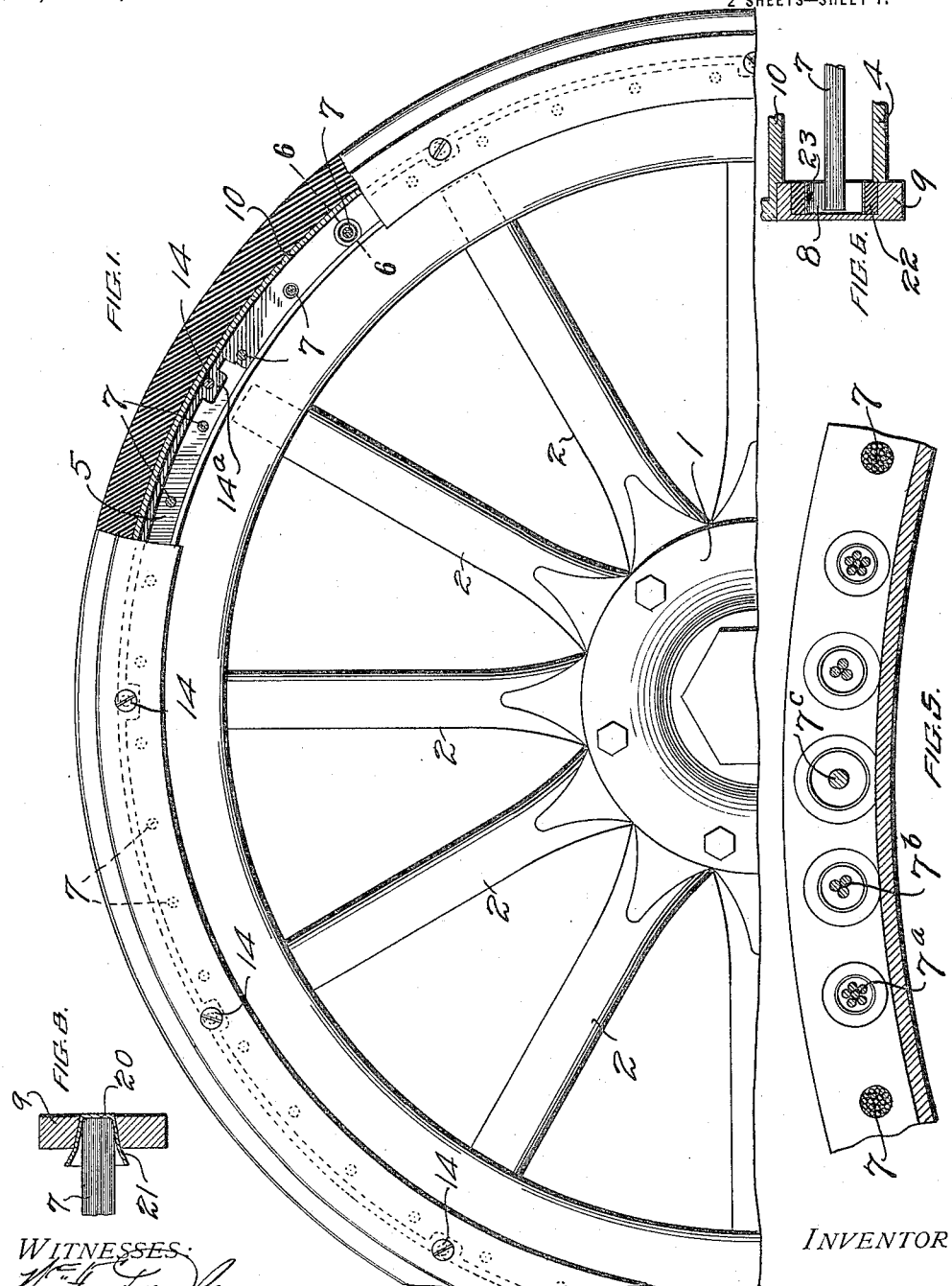

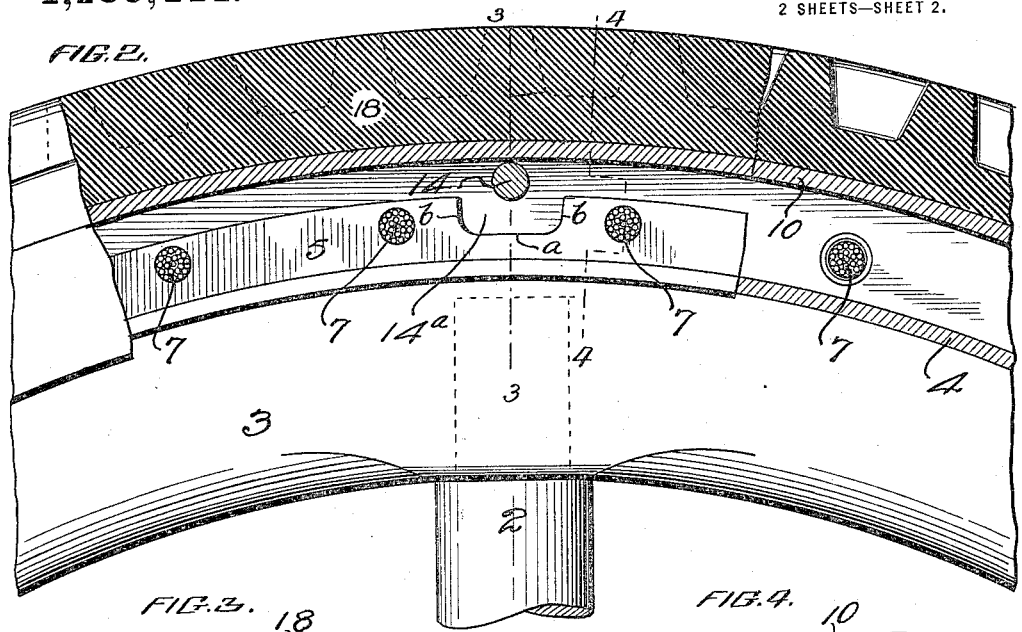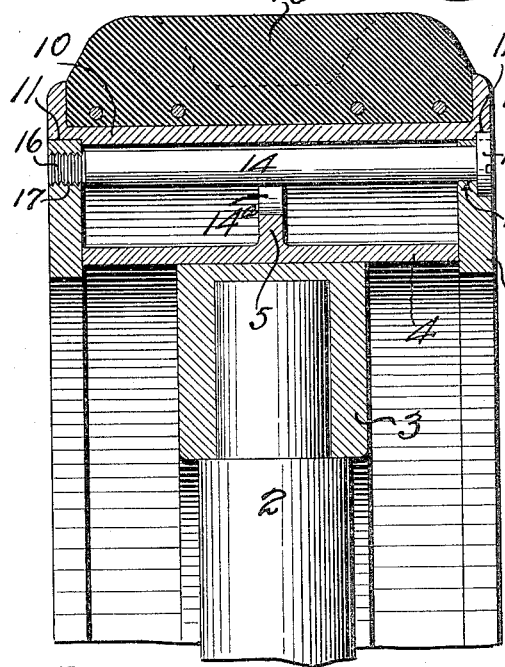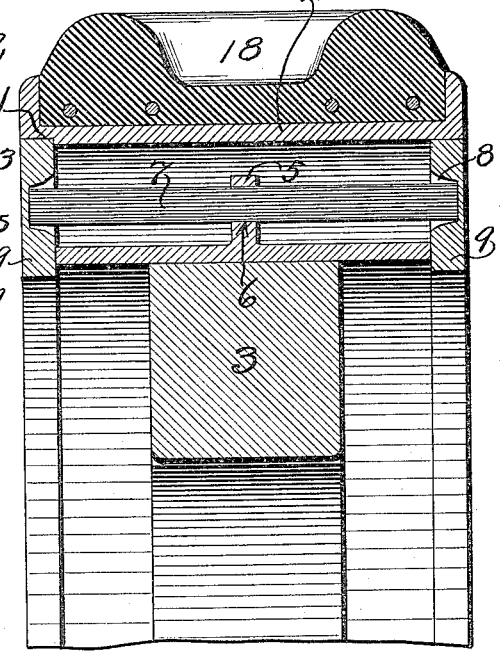

JOSEPH SANDERS, OF WASHINGTON, DISTRICT OF COLUMBIA.

SPRING-WHEEL.

1,155,444.            Specification of Letters Patent.         Patented Oct. 5, 1915.

Application filed March 6, 1912. Serial No. 681,883.

*To all whom it may concern:*

Be it known that I, JOSEPH SANDERS, a citizen of the United States, residing at Washington, District of Columbia, have invented certain new and useful Improvements in Spring-Wheels, of which the following is a specification.

This invention relates to the subject of vehicle wheels, and more particularly to that type of wheels known as spring wheels, intended to provide a resilient or spring effect in the manner of pneumatic tires such as commonly employed on the wheels of motor vehicles.

To this end the invention contemplates certain novel and practical improvements in spring wheels which secure theoretically correct provision for receiving and absorbing all shocks and stresses communicated in any and all directions to the tire of the wheel while rolling or being driven over a surface. In this connection, the invention has especially in view a thoroughly practical means for utilizing the supporting and resilient properties of springs in such a manner as to provide a wheel for driving or driven purposes which shall have a peripheral resilience, equivalent, for all substantial purposes, to that possessed by the well known pneumatic tire.

Without the disadvantages of the pneumatic tire the present invention provides a spring wheel having a maximum resiliency and life, and embodying spring elements arranged in such a manner as to secure uniform yielding thereof. Also, the mounting and arrangement of the spring elements are so designed as to provide a wide range of sensitiveness, so as to respond to light and heavy shocks, and this feature also involves the floating of the movable rim member in such a manner that there is a responsive yield to the corresponding spring elements in action, when a shock or stress is imposed upon any one of the said elements.

A further object of the invention is to provide an arrangement and mounting of the spring elements that not only secures a uniform distribution of the load, shocks, and stresses throughout, but also provides a construction that effectively takes care of the torque.

Another object of the invention is to provide a spring wheel of large reserve capacity, that is to say, having the spring elements in such form and arrangement as to take care of any predetermined load and traction without exceeding the elastic limit of the spring supporting elements, and in addition to that, to provide means whereby supplemental spring supporting elements, normally in reserve, automatically come into play as a supporting medium before the elastic limit of preceding spring elements or units are reached, thereby providing what may be termed a graduated spring support which takes care of shocks and strains that are excessive for the main supporting elements.

A still further object of the invention is to provide a simple and separable construction that admits of ready assembling, and ready taking apart of the wheel for purposes of repair and adjustment.

With these and many other objects in view, which will more readily appear as the nature of the invention is better understood, the same consists in the novel construction, combination and arrangement of parts, hereinafter more fully described, illustrated and claimed.

While the invention is necessarily susceptible to embodiment in different kinds of wheels, and is also capable of various structural modifications, without departing from the spirit or scope thereof, certain practical embodiments are shown in the accompanying drawings, in which—

Figure 1 is an elevation of a portion of a spring wheel embodying the present invention, parts being shown in section. Fig. 2 is an enlarged circumferential sectional view of a portion of the yielding rim structure. Fig. 3 is a cross sectional view on the line 3—3 of Fig. 2. Fig. 4 is a similar view on the line 4—4 of Fig. 2. Fig. 5 is an enlarged detail sectional view further illustrating the reserve spring supports that successively come into action. Fig. 6 is a detail sectional view on the line 6—6 of Fig. 1 illustrating the employment of the auxiliary rubber buffers for the bearings. Fig. 7 is a detail diagrammatic view of one of the wire-bundle units, showing by dotted and full lines the normal, straight condition of the bunch, and the working flexed condition of the bunch, the latter illustration indicating the feature of the individual strands being unconnected and having free ends, which permits the sliding-over and upon one another, thus preserving the full resiliency and action of each strand. Fig. 8 is a detail view showing a modification that may be resorted to in the means for seating the free ends of the wire-bundle units, thus decreasing wear, making a lighter structure, and cheapening and facilitating manufacture.

Like references designate corresponding parts in the several figures of the drawings.

In carrying out the present invention, very careful consideration has been taken of the fact that in order to provide a practical spring wheel embodying spring elements or spring wires arranged laterally or substantially parallel to the axis of the wheel, it is necessary to have a sufficient number of spring wires, and wires of sufficient strength to take care of not only predetermined loads and traction, but also of abnormal loads and strains imposed at various angles and in various directions. Furthermore, in order that the life of the spring be of reasonable duration the deflection must not be so great as to give a fiber stress greater than the elastic limit of the metal.

Tests which have been made by me show that the tire member must have an elastic motion of not less than one quarter of an inch. To obtain such deflection with a spring, the length of which does not exceed that permissible for the wheels and tires in ordinary use, and still keep the fiber stress within the elastic limit, requires a very thin wire even when the best metal is used.

A tire of four inches in width would have an effective spring length of not over three and three-quarters inches. A spring of this length supported at its center and having its ends deflect one-quarter of an inch, would, in order not to exceed a fiber stress of 150,000 pounds for a square inch, have a diameter of about .040. A round wire spring of .040 of an inch diameter and three and three-quarters of an inch would have a carrying capacity of less than one pound for a maximum deflection of one quarter of an inch. It is therefore, evident that, with a wheel load of only 500 pounds representing in a four wheeled vehicle a total weight and load of only 2,000 pounds, it would take 500 of such springs and at that would, standing still, deflect them to their full elastic limit. Added to this, with the stress due to shocks and power in driving, it will be evident that several thousand of such springs must be used.

The impossibility of commercial manufacturing will be understood at once when it is considered that for one wheel of 2,000 springs, it would require, 6,000 holes of .040 of an inch diameter to be drilled, and 2,000 clamping devices to hold them in place and the assembling and locating the springs in their proper holes would be next to impossible. As far as is present known to me, the prior art does not disclose a practical way of overcoming these difficulties above mentioned to render practicable the use of spring supporting elements within and about the wheel to give to it a resiliency equivalent to or approaching that of a pneumatic tire.

Accordingly, in carrying out the present invention I propose in practice to employ relatively very thin wire strands of spring steel. The lack of supporting strength in these strands is compensated for by the use of a large number thereof. One of the wheels which I have made and successfully tested on an automobile of about 1,300 pounds in weight, having approximately eighteen hundred of said strands. However, the use of this large number of thin wires is made entirely practicable and possible by bunching the same into bundles with the individual wire strands unconnected and their ends free. This conserves the full resiliency and action of each strand in the bundle, while the combined strands of each bundle aggregately produce a spring unit of relatively great supporting strength, as well as resiliency.

In the embodiment illustrated in the drawing, there is shown an ordinary wheel having the invention applied thereto as an attachment. Referring to this illustration, the wheel body includes the usual hub 1, spokes 2, and felly 3. At the outer end of the spokes or upon the felly 3, there is arranged an inner fixed rim member 4, preferably in the form of a band of T-shape in cross section and whose circumferential rib 5 is pierced by a series of holding openings 6 which receive the central portions, by a driving fit or otherwise, of the wire-bundle units 7. The opposite free ends of these units are received in the flared or equivalent bearing sockets 8, which are provided in the opposite parallel supporting cheek plates 9. These cheek plates lie against the opposite side edges of the inner rim member 4 and combine therewith to give lateral rigidity and strength to the structure, while the said rim member 4 also resists lateral thrust.

The side cheek plates 9 are carried by and are movable with an outer movable rim member 10 which is yieldingly supported by and from the spring supporting units 7. Various means may be employed for detachably securing the cheek plates to the outer rim member 10, as for instance by providing said rim member at its opposite inner edges with rabbeted seats 11 and 12, in one of which is seated the outer edge of one cheek plate 9, and in the other of which seat 12 is seated the head 13 of tie bolts 14, extending through unthreaded openings 15 in one cheek plate, and having threaded tips 16 engaged in threaded openings 17 in the other cheek plate 9 preferably riveted to prevent loosening from vibration. This structure is provided for the ready and easy assembling and disassembling of all parts of the invention whenever required or necessary.

The outer rim member 10 may be of a channeled formation to receive therein a solid rubber or equivalent tire tread 18, which may be of various forms, either solid as suggested in Fig. 1 or of the double ribbed and transversely grooved type illustrated in Figs. 2, 3 and 4, though it will be understood that any form of tire tread construction will be available for this purpose.

From the foregoing description it will be understood that the outer rim member is normally supported by any predetermined number of the wire-bundle units 7 which are made up, by bunching, of a large number of thin spring steel wires, the individual strands of each unit being unconnected, and having free ends which thus permits, as shown in Fig. 7, them to slide over and upon one another, whereby the full resiliency and action of each strand is preserved while in the aggregate they provide for a relatively great supporting strength. The flare of the sockets 8 is intended to permit of this play and self-adjustment of the free ends of the wire strands of each unit and for easy assembling, and in this connection it will be noted, that a practical modification that may be resorted to is suggested in Fig. 8, and consists in using cheek plates 9 of comparatively thin metal that can be punched with holes 19 to receive therein, by a driving fit or otherwise, the closed end portions 20 of flaring steel bushings 21 which constitute the bearing sockets for the ends of the units. This construction makes assembling easy and also permits the use of hardened steel for the bearings of the hard steel wires. Also the use of thinner metal is permitted for the cheek plates or rings, and the cheaper process of punching, instead of drilling, the holes may be resorted to.

For that embodiment of the invention which provides for reserve spring supports, this may be carried out by having certain spring supports always and normally in use as the main supporting elements for the tire, and other spring supporting elements normally in reserve. While the normal and reserve spring supporting elements may be all of the same kind, as plainly shown by the graduated bearing sockets in Fig. 1 of the drawings, yet it may be desirable to provide an arrangement as shown in Fig. 5, wherein each wire-bundle unit 7 is succeeded by a series of graduated spring reserve units $7^a$, $7^b$, and $7^c$, the free ends of which units are normally out of contact with and free from the walls of their bearing sockets 8, in the manner shown in Fig. 6. In the construction illustrated in Fig. 5, the said reserve units may consist of spring wires of progressively increasing diameter, and hence of progressively increasing supporting strength. The effect of this construction has already been indicated, viz., the said reserve spring units only come into play under extreme conditions, and then only in progressive order before the elastic limit of preceding spring units has been reached, and not bending so far, themselves, they keep within their elastic limits. In connection with the bearing sockets 8, for the ends of the reserve springs, units may be bushed with auxiliary rubber buffers 22 having steel or equivalent wear linings 23, said buffers supplementing the resiliency of the spring unit. See Figs. 1, 5 and 6.

From the foregoing, it will be observed that the reserve springs are preferably arranged in a plurality of circumferential sets, each set consisting of the circumferential series of reserve springs of the same character and strength. By reason of this construction and arrangement, the reserve spring units of each set of such units are normally out of action, and are so disposed that all of the said units receive the load in unison, or in other words come into play at the same time. This is true of each circumferential set of reserve springs, regardless of whether one or more sets thereof are brought into play under abnormal loads imposed upon the wheel.

A feature of practical importance in carrying out the invention resides in the dual function of the tie bolts 14. It will be observed from the drawings that these bolts lie in the radial plane of clearance notches $14^a$ formed at intervals in the edge of the peripheral rib 5 of the inner fixed rim member 4. Each of these clearance notches present bottom abutments $a$ and stop shoulders $b$. In this connection, it is to be understood that the notches $14^a$ not only provide clearance for the tie bolts, but also present stops or abutments that check and arrest abnormal torsional strain, as well as shocks and strains in radial directions. Under excessive loads the tie bolts 14 come into solid engagement with the abutments $a$ at the bottom of the clearance notches, while torsional strain due to sudden starting or to other strains or shocks is checked or arrested by the engagement of the bolts 14 with the shoulders $b$, thus protecting and safe-guarding the whole structure, and materially contributing to its durability and service.

From the construction described, it will be observed that the provision of a large circumference relative to the weight carried gives durable bearings and also prevents the turning of the wire bundle-units in the center support. Furthermore it is observed in case of defects in and the breaking of one or more of the individual wire strands, that no appreciable loss or damage is sustained on account of the very large number of wires embodied in the structure, being very thin they will not damage or interfere with working. At the same time the ready accessibility of every part of the structure admits of cheap and easy repairs.

Another feature of utility in the practical operation of the invention is that of the bundles acting as a sponge or holder for the lubricant.

I claim:

1. A spring wheel construction including fixed and movable members, a constantly active normal spring support for the movable member, and a supplemental circumferential set of reserve spring units normally out of action and so disposed that all of the said units act in synchronism to simultaneously receive the load.

2. A spring wheel construction including fixed and movable members, a constantly active normal spring support for the movable member, and a plurality of supplemental circumferential sets of reserve spring units, all of which sets are normally out of action, and the units of each set being so disposed as to act in synchronism to simultaneously receive the load.

3. A spring wheel construction including fixed and movable members, a constantly active normal spring support for the movable member, and a plurality of supplemental circumferential sets of reserve spring units, all of which sets are normally out of action, and the units of each set being so disposed as to act in synchronism to simultaneously receive the load, the said several sets of reserve spring units being graduated in strength and progressively coming into play according to the load.

4. A spring wheel construction including fixed and movable members, one of which has bearings, a constantly active normal spring support for the movable member, and a supplemental circumferential set of reserve springs carried by one member and normally out of contact with said bearings, and all of said springs in said set acting in synchronism so as to come into contact at the same time with their bearings on a predetermined load.

5. A spring wheel having fixed and movable members, a series of wire-bundle units normally supporting one of said members from the other, and other reserve spring supports similarly arranged but normally free from supporting function, said reserve spring supports being graduated in strength.

6. A spring wheel having fixed and movable members, a series of wire-bundle units supporting one of said members from the other, and other normally inactive reserve spring supports consisting of spring elements of progressively increasing strength.

7. A spring wheel having a rim member provided with a central rib having holding openings therein, a series of wire-bundle units held in the center of said opening, a movable rim member having rabbeted seats at its edges, side cheek plates having bearing sockets for receiving the end portions of said units, and one of said cheek plates engaging in one of said rabbeted seats, and bolts detachably connecting the two cheek plates and having heads engaging in the other of said seats.

8. A spring wheel having a fixed member, a movable member having sockets provided with rubber buffers, and a supporting element carried by the fixed member and engaging in said sockets, but normally out of contact with said buffers.

9. A spring wheel having a fixed member, a movable member having sockets provided with rubber bushings, and supporting spring-units carried by the fixed member and having their ends engaged in the sockets of the movable member.

10. In a spring wheel, an inner and an outer rim, one of said rims having a plurality of openings which are formed in sets of different radial dimensions, and a plurality of spring members between the rims and each having a free end movable through an opening in the rim.

11. In a spring wheel, an inner and an outer rim, one of said rims having an annular lug member provided with a plurality of openings, and spring members between the rims, and each having free ends movable through an opening in the lug member, said openings being formed in sets of different radial dimensions.

12. In a spring wheel, an inner and an outer rim, one of said rims having an annular lug member provided with a plurality of openings, and spring members between the rims and each having free ends movable through an opening in the lug member, said openings being formed in sets, the walls of one set of which are engaged at all times by the free ends of their respective spring members and the walls of another set of which are brought into engagement with their respective spring members after a predetermined load is reached.

13. In a spring wheel, an inner and an outer rim, one of said rims having an annular lug member provided with a plurality of openings, and spring members between the rims, and each having free ends movable through an opening in the lug member, said openings being formed in sets, the walls of one set of which are engaged at all times by the free ends of their respective spring members and the walls of additional sets of which are brought into engagement with their respective spring members as predetermined loads are reached.

In testimony whereof I hereunto affix my signature in the presence of two witnesses.

JOSEPH SANDERS.

Witnesses:
MARY K. KOOGLE,
EMORY L. GROFF.